US012603012B2

(12) United States Patent　　　　(10) Patent No.:　US 12,603,012 B2
Maalioune et al.　　　　　　　　　(45) Date of Patent:　　Apr. 14, 2026

(54) METHOD AND SYSTEM FOR DETERMINING AIRCRAFT LANDING RUNWAY CONDITIONS

(71) Applicants: SAFRAN AIRCRAFT ENGINES, Paris (FR); SAFRAN ELECTRONICS & DEFENSE, Paris (FR); SAFRAN LANDING SYSTEMS, Velizy-Villacoublay (FR); SAFRAN NACELLES, Gonfreville-L'orcher (FR)

(72) Inventors: Hakim Maalioune, Moissy Cramayel (FR); Laurent Miralles, Moissy Cramayel (FR); Christophe Bastide, Moissy Cramayel (FR); Jérémy Edmond Fert, Moissy Cramayel (FR); Vincent Hupin, Moissy Cramayel (FR)

(73) Assignees: SAFRAN AIRCRAFT ENGINES, Paris (FR); SAFRAN ELECTRONICS & DEFENSE, Paris (FR); SAFFAN LANDING SYSTEMS, Velizy-Villacoublay (FR); SAFRAN NACELLES, Gonfreville-L'orcher (FR)

( * ) Notice: Subject to any disclaimer, the term of this patent is extended or adjusted under 35 U.S.C. 154(b) by 186 days.

(21) Appl. No.: 18/265,103

(22) PCT Filed: Dec. 1, 2021

(86) PCT No.: PCT/FR2021/052168
§ 371 (c)(1),
(2) Date: Jun. 2, 2023

(87) PCT Pub. No.: WO2022/123147
PCT Pub. Date: Jun. 16, 2022

(65) Prior Publication Data
US 2024/0105070 A1　　　Mar. 28, 2024

(30) Foreign Application Priority Data

Dec. 11, 2020　(FR) ....................................... 2013115

(51) Int. Cl.
*G08G 5/54*　　　　(2025.01)
*B64F 1/36*　　　　(2017.01)
*G08G 5/22*　　　　(2025.01)

(52) U.S. Cl.
CPC ................. *G08G 5/54* (2025.01); *B64F 1/36* (2013.01); *G08G 5/22* (2025.01)

(58) Field of Classification Search
None
See application file for complete search history.

(56) References Cited

U.S. PATENT DOCUMENTS 10,202,204 B1　　2/2019　Daidzic
2008/0030073 A1*　2/2008　Goodman ................ G08G 5/76
303/191

(Continued)

FOREIGN PATENT DOCUMENTS

FR　　　　3077913 A1　　8/2019

OTHER PUBLICATIONS

International Patent Application No. PCT/FR2021/052168, International Search Report and Written Opinion dated Mar. 15, 2022, 14 pages (12 pages of original document and 2 pages of English translation).

*Primary Examiner* — David P. Merlino
(74) *Attorney, Agent, or Firm* — Kilpatrick Townsend & Stockton LLP

(57)　　　　　　ABSTRACT

Said method for determining aircraft landing runway conditions comprises the steps of: acquiring a set of data groups of different types (D1, D2) for evaluating and monitoring runway degradation conditions; deriving weighting coefficients (Ki) from each data group; filtering the data; deter- (Continued)

mining, for each data group, a partial runway condition; modifying the weighting coefficients of each data group; and combining the partial runway conditions to derive a runway condition coefficient (RWYCC) associated with a confidence index (C1) derived from the modified weighting coefficients.

16 Claims, 4 Drawing Sheets

(56) References Cited

U.S. PATENT DOCUMENTS

| 2009/0125169 | A1* | 5/2009 | Edwards | ................. | G08G 5/54 |
| | | | | | 701/19 |
| 2010/0079308 | A1* | 4/2010 | Fabre | ....................... | G08G 5/76 |
| | | | | | 340/951 |
| 2013/0226430 | A1* | 8/2013 | Rado | ...................... | B60T 8/171 |
| | | | | | 701/80 |
| 2014/0012437 | A1* | 1/2014 | Jones | ................... | B60T 8/1703 |
| | | | | | 701/15 |
| 2015/0142388 | A1* | 5/2015 | Metzger | ................ | G01N 19/02 |
| | | | | | 702/189 |
| 2016/0362093 | A1* | 12/2016 | Gadzinski | ................ | G08G 5/55 |
| 2019/0156682 | A1* | 5/2019 | Schwartz | ................ | H04Q 9/00 |
| 2020/0160736 | A1* | 5/2020 | Moll | ....................... | G08G 5/21 |

* cited by examiner

| Di : | | |
|---|---|---|
| S1 | S2 | S3 |
| Rwycc 1 / IC1 | Rwycc 2 / IC2 | Rwycc 3 / IC3 |
| $D1_{ij}$ $K1_{ij}$ | $D2_{ij}$ $K2_{ij}$ | $D3_{ij}$ $K3_{ij}$ |

| Di : | | |
|---|---|---|
| S4 | S5 | S6 |
| Rwycc 4 / IC4 | Rwycc 5 / IC5 | Rwycc 6 / IC6 |
| $D4_{ij}$ $K4_{ij}$ | $D5_{ij}$ $K5_{ij}$ | $D6_{ij}$ $K6_{ij}$ |

METHOD AND SYSTEM FOR DETERMINING AIRCRAFT LANDING RUNWAY CONDITIONS

The present invention relates generally to optimising airport traffic and reducing the number of runway closures which may have very significant financial consequences for airport operators.

More particularly, the invention relates to determining the conditions of landing runways at an airport in order to optimise the use of runways and at the same time complying with security requirements.

Currently, airport operators are required to monitor runway conditions. This monitoring is carried out either from radio reports provided by the aircraft just after landing, or from measurements of coefficients of friction made by test trucks which circulate on the runways, or from sensors buried in the runway which determine the type and level of contaminants, or from weather sensors, or from manual observations and measurements carried out by a runway inspector, or also from the manual combination of all of these data sources.

The radio reports supplied by the pilot on landing may be subjective in nature. With regard to measurements of the coefficients of friction, this source of data is also imprecise as the test truck used to carry out the measurements does not make it possible to effectively simulate the taxiing of an aircraft, in particular a large carrier, so that the measurements made are relatively inaccurate. In addition, this source of data requires the runways to be closed when being measured. The measurements from buried sensors only represent a sample of 1 cm2 on a runway of several kilometres. The same applies to manual measurements carried out by runway inspectors.

It is also known to estimate an indicator of runway slipperiness at an airport by detecting the lateral deviation of an aircraft from a reference trajectory, or to monitor the deceleration of an aircraft as a function of braking data.

In view of the above, the aim of the invention is to provide the status of landing runway conditions for aircraft which have increased reliability and relevance and which can be used for optimising the use of runways by airport operators. Furthermore, the objective is to make all of these available measurement sources consistent and to add new, more reliable processes, weighted according to the relevance of each data source.

According to a first aspect, the object of the invention is therefore a method for determining aircraft landing runway conditions, which comprises the steps of:

acquiring a set of data groups of different types for evaluating and monitoring deteriorating runway conditions;

deriving weighting coefficients for each data group;

filtering the data;

determining, for each data group, a partial runway condition;

modifying the weighting coefficients of each data group; and combining the partial runway conditions to produce a runway coefficient associated with a confidence index derived from modified weighting coefficients.

Advantageously, during filtering, the data is grouped by braking zone segments, each associated with identification information of the braking zone segment, dating information of said data, segment position information and a modified weighting coefficient.

According to another feature of the method according to the invention, during the acquisition of data, first data relating to braking parameters of the aircraft and second data derived on the ground relating to the taxiing conditions of the aircraft are acquired.

The first data is advantageously acquired when the aircraft is taxiing on the landing runway at a speed below a threshold value.

According to another feature, at the end of the filtering step, the first data relating to the braking parameters is supplied to a calculation step capable of deriving a time-stamped coefficient of friction of the runway and a modified weighting coefficient.

Advantageously, in the calculation step of the coefficient of friction, the coefficient of friction is calculated from the first filtered data and the second filtered data.

The method can also include a step of decoding the first data and a step of decoding the second data.

For example, the second data comprises aircraft position data, data relating to the runway conditions and meteorological data.

Advantageously, the weighting coefficient derived from the filtering step is modified as a function of time or of the sampling frequency of the data.

The method can also include a prior step of initialising weighting coefficients for each data group.

According to a further feature of the method according to the invention, during the step of determining the partial runway condition, data from another data group is used.

It can be provided that the runway coefficient is derived for different sectors of the runway, in particular for each third of the runway. In addition, a history of the runway coefficients can be compiled.

The object of the invention is also a system for determining aircraft landing runway conditions, this system comprising:

means for acquiring a set of data groups of different types for evaluating and monitoring deteriorating runway conditions;

means for assigning weighting coefficients to each data group;

means for filtering the data; and calculating means configured to determine, for each data group, a partial runway condition, and to modify weighting coefficients of each data group;

said calculating means being suitable for combining partial runway conditions to produce a runway coefficient associated with a confidence index derived from modified weighting coefficients.

Other aims, features and advantages of the invention will appear upon reading the following description, given solely as a non-limiting example, and made with reference to the appended drawings wherein.

Figure 1:
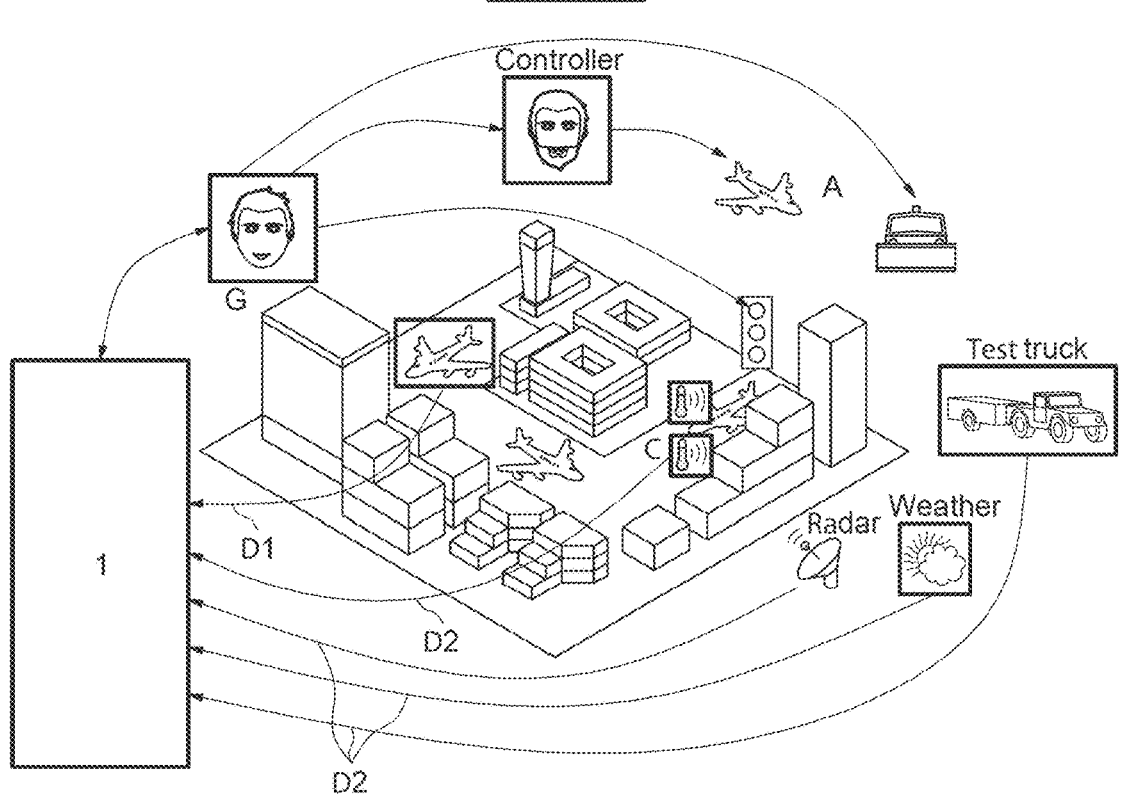
FIG. 1 shows the general architecture of a system for determining landing runway conditions according to the invention.

An exemplary embodiment of a system for determining aircraft landing runway conditions according to the invention is shown in FIG. 1.

This system is intended to calculate and provide a runway coefficient RWYCC (Runway Condition Code), for various sections of landing runways at an airport and provide runway conditions to the airport operator to enable optimal use of the runways, in particular by reducing runway closures. This RWYCC coefficient complies with the GRF (Global Reporting Format) regulations in force according to RTM.0704.

This RWYCC coefficient is derived from various data sources and is provided with a confidence index that reflects the reliability of the calculated coefficient.

The RWYCC coefficient is in particular derived from first data relating to braking parameters of the aircraft and from second data derived on the ground relating to the taxiing conditions of the aircraft.

Figure 2:
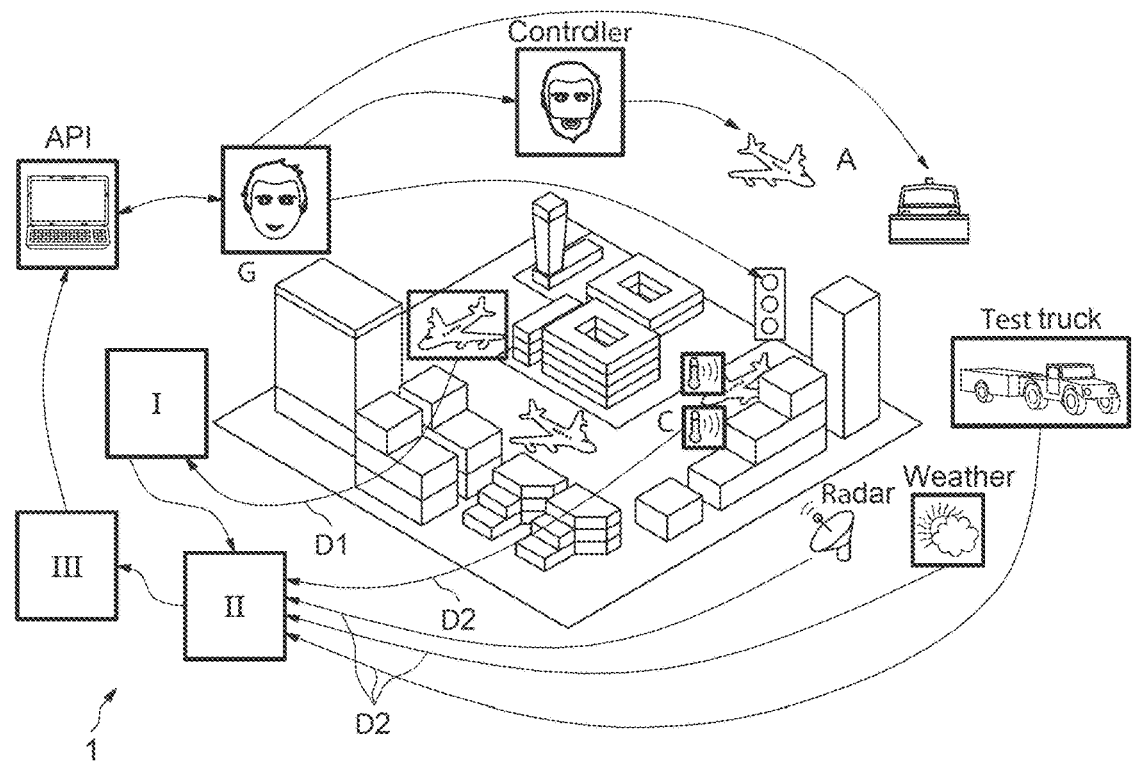
FIG. 2 is an overview of a system for determining the conditions of landing runways according to the invention, showing the main functional platforms of the system.

Also with reference to FIG. 2, the first data D1 is delivered by the aircraft, after landing, in the form of a radio report.

This may include for example data comprising in particular the type of aircraft, the weight of the aircraft, the wheel speed relative to the ground, the hydraulic braking pressure, the flight phase, the thrust reverser status, the brake pedal depression, the GPS positions . . .

The second data D2 relates more specifically to the runway conditions and is supplied by sensors C, by radar data Rd, by weather reports W or measurements provided by test trucks Tt.

The sensors are used for example for determining the possible presence of contaminants, such as water, snow, stagnant water, mud, . . . , the thickness of the contaminant, the surface condition of the runway, for example dry, wet, slippery wet, the temperature on the ground, . . .

The radar data is intended in particular for determining the position of the aircraft and the test truck provides a coefficient of friction.

The system for determining the runway conditions essentially comprises a data acquisition and calculation platform 1 which acquires various data groups D1 and D2 useful for evaluating and monitoring deteriorating conditions of airport runways, and calculates, for each section of runway, for example for each third of the runway, a runway coefficient associated with a confidence index. This platform 1 also provides a man-machine interface accessible for example by means of an API computer application by the airport manager G who provides this information to the air traffic controller Ctrl to supply this information to aircraft in flight A.

The platform 1 thus includes an interface I for collecting and processing flight data which receives data D1 supplied by the aircraft, a data storage and decoding step II receiving first data D1 decoded by the interface I and second data D2 and a calculation step III receiving data decoded by the storage and decoding step II and configured to calculate from decoded data the runway coefficients, each associated with a confidence index, in a format suitable for presentation on the API interface.

The main steps of the method for determining the runway conditions according to the invention will now be described with reference to FIG. 3.

It can be seen that the method includes two data acquisition and processing phases carried out in parallel for the acquisition and processing of first and second data groups D1 and D2.

With respect firstly to the braking data of the aircraft D1, in a first step 2, the raw data is acquired.

Figure 4:
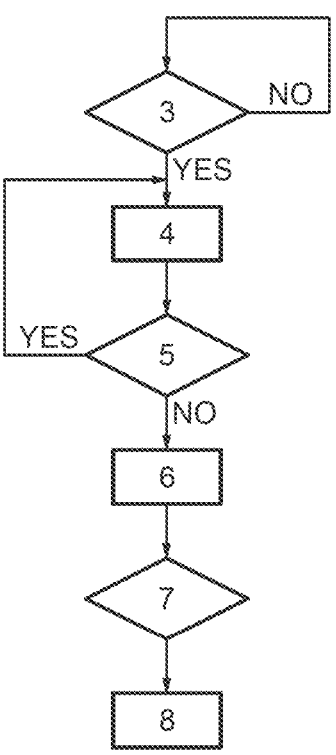
FIG. 4 is a flowchart illustrating the acquisition of data relating to the braking parameters of the aircraft.

As shown in FIG. 4, this first step 2 is initiated on landing, as soon as the aircraft comes into contact with the runway (step 3).

If this is the case, the braking data is recorded by the interface I (step 4). This data is recorded as long as the aircraft is on the landing runway and the speed relative to the ground is greater than a speed limit, for example ten knots (step 5). Outside of these conditions, the recording is stopped (step 6). In the following step 7, it is checked whether the data transmission conditions are met and if so the recorded raw data is transmitted and stored in the storage and decoding step II (step 8).

The transmission conditions can be determined according to the type of aircraft, the airline and the destination airport.

At the end of this data capture phase, the raw data is decoded (step 9) by the data storage and decoding step II, then filtered and processed by the third calculating step III (step 10).

It should be noted that the collection and processing interface I and the storage step II assign to each data group a weighting coefficient, respectively K1 with respect to the first data group D1 and K2 with respect to the second data group D2. Thus, as a non-limiting example, the radar data is associated with a weighting coefficient 25, the sensor data is associated with a coefficient of 30, the meteorological data has a coefficient of 20 and the braking data has a coefficient of 25.

For each data group, a partial runway condition is calculated and the evolution of the runway conditions associated with an estimation of a confidence index from the calculated runway conditions is determined.

The weighting coefficient K1 or K2 of a subset is conditioned during the method by the weighting of the data group, the relevance of the analysed data, their sampling frequency, and the dating of the acquired data, as a function of time, the confidence index degrading as a function of time, without new data.

The weighting coefficients are also modified if data from another group is taken into account.

Indeed, the processing of each data group is capable of using raw data from another raw decoded data group as input.

For example, braking data can be combined with radar data in order to correlate the position seen by the aircraft and the position given by the radar. Likewise, the braking data can be combined with sensor data in order to use the braking data, according to the context, to optimise and correlate the calculations.

For example, if the radar data r is not available, the positioning data of the aircraft available on the on-board computers is used.

It should be noted that, by default, this radar data is not present, and the data in the aircraft is used, in addition to the wheel speeds, the speed of the aircraft, the depression of the pedals, . . .

Indeed, a negative temperature and snowfall forecast by the sensors will imply a predominance of the runway coefficient associated with a contaminated runway.

The subsequent calculation of the runway coefficient is a result of merging the results from each data group weighted by the modified weighting coefficient and incorporates an average confidence index from the weighting of the coefficients of each subset of data.

Figure 5:
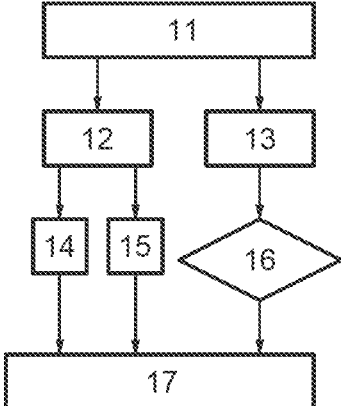
FIG. 5 illustrates the filtering of data.

With reference to FIG. 5, the filtering algorithm is applied in parallel to various data configurations, namely to standard qualification or company-specific qualification data. In this figure, for the sake of clarity, only the processing performed in one data configuration has been illustrated, the processing being otherwise performed on the other data configurations.

For each data type, the braking zone of the runway is divided into braking zones (step 11). For each braking zone, it is then determined whether the braking is manual braking or automatic braking. However, the data is evaluated differently, as to whether it is a manual braking (step 12) or automatic braking (step 13). In the case of manual braking (step 12), the recorded and non-recorded data are gathered separately by quick access recording QAR (steps 14 and 15). In the case of automatic braking, it is checked to see whether a maximum braking coefficient is reached in each braking zone (step 16).

During the filtering, the weighting coefficients are updated according to the nature of the braking, automatic braking generally involving braking with a lower braking coefficient, involving an increase in weighting coefficients K'1, whereas recording data by QAR involves a decrease in the weighting coefficients K' 1.

The braking segments are thus formulated according to the nature of the braking and recording type (step 17).

For each braking segment, a vector is made, each vector identifying the segment, the type of segment and the modified weighting coefficient K'l assigned to the data.

In addition, data, a time stamp, the position and the braking phase are associated with each segment.

Furthermore, the filtering used is temporal filtering and is specific to each type of data.

In addition, the filtering is carried out as a function of the sampling frequency of the data in order to standardise the sampling frequency used for data acquisition by weighting the data differently according to its sampling frequency. At the end of the filtering step, the first data D1 relating to the braking parameters of the aircraft is processed by the calculation step III for calculating the coefficient II of friction of the runway (step 18).

Figures 6, 7:
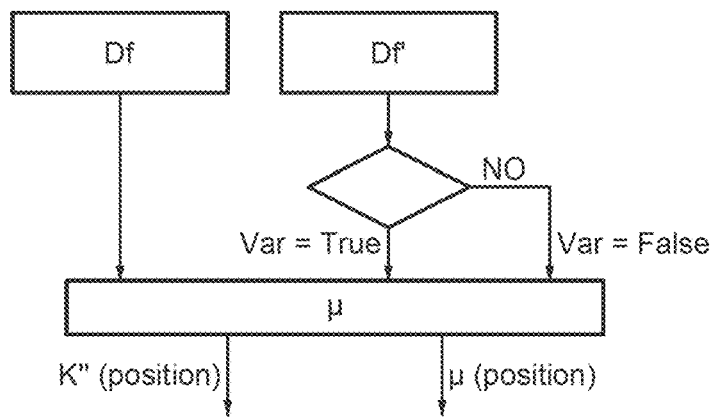
FIG. 6 illustrates calculating the coefficient of friction $\mu$ seen by the aircraft.
FIG. 7 shows schematically an example of the report resulting from the method for determining runway conditions according to the invention.

With reference to FIG. 6, this calculation is made on the basis of filtered data Df identified by the runway segment and the runway type and, if necessary, on the basis of filtered data Df from another data group.

With regard to the braking data, this is integrated with the data type information.

The data type is a vector which makes it possible to know the type of braking, the type of precision, the type of aircraft or material, . . .

If other data is available, for example data from sensors or radar, they are also integrated into the calculation and a Boolean variable Var is set to "TRUE" to indicate that the weighting coefficient associated with this data can be improved.

If this is not the case, the Boolean variable Var is set to "FALSE" to indicate that the weighting coefficient will not be affected.

For example, the calculation of the coefficient of friction μ seen by the aircraft is performed by prior learning obtained from data from aircraft that have already landed or from experimental data, and uses a model estimated from this data, the coefficient of friction being then obtained by prediction from filtered data.

Of course, the prediction is updated as the training base is added to with newly input data.

Various types of techniques can be used for this purpose.

For example, a Random Forest algorithm can be used to predict the value of a coefficient of friction from decoded data.

In the step of calculating 18 the coefficient of friction, the weighting coefficient K1" is modified as a function of the position of the braking zone. In the following step 19, a partial runway condition RCC is defined locally from the value of the coefficient of friction and, after step 19, the weighting coefficient K1" is modified as a function of time (K1'''), the oldest data being assigned a downgraded confidence coefficient.

Figure 3:
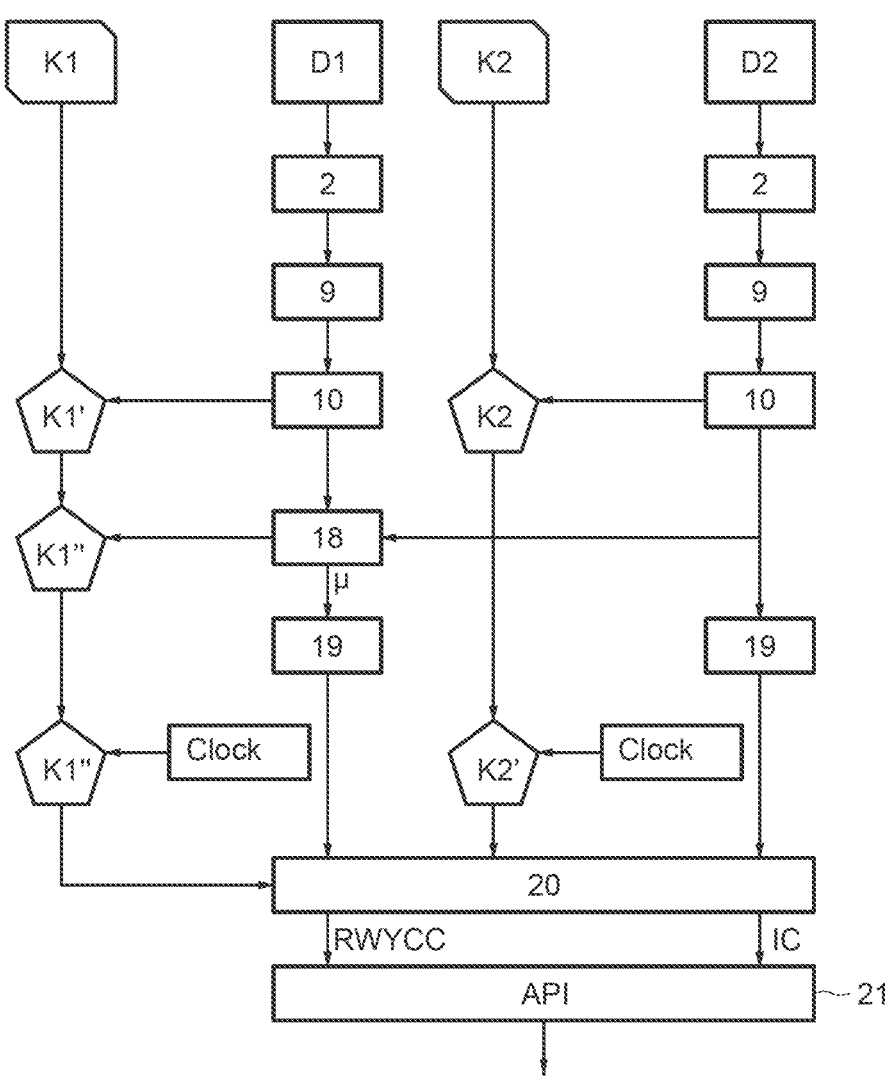
FIG. 3 is a flowchart showing the main phases of data acquisition and processing for deriving the runway coefficient.

As shown in FIG. 3, the second data D2 derived from the ground relating to the taxiing conditions of the aircraft is also subject to the capturing, decoding and filtering steps 2, 9 and 10. However, the filtered data is used directly for calculating the partial runway condition RCC (step 19). It is only after the step of calculating the partial runway condition that the weighting coefficient is modified as a function of time (K'2).

In the following step 20, the runway coefficient is calculated, this runway coefficient being associated with a confidence index calculated from modified weighting coefficients. This calculation is made from the sum of weighted local runway conditions.

In other words, the runway coefficient RWYCC is derived from the following relationship:

$$RWYCC = \Sigma RCC \times K''' / \Sigma K'''$$

Thus a global runway coefficient is provided, for each section of the runway, together with a confidence index CI, the value of which depends on the moment of data acquisition and the position of the braking zone.

Lastly, in the final step 21, the runway coefficient and confidence index available for each sector of the runway are delivered to the API computer application, advantageously accessible online.

An example of the application of such a report is shown in FIG. 7.

The API application provides for example a window illustrating different runways, here two in number, comprising multiple sectors S1, S2, S3, S4, S5, S6, each identified.

Each sector is associated with a runway coefficient RWYCC, here Rwycc1 to Rwycc6, associated with its confidence index CI, here CI1 to CI6.

Furthermore, each sector is associated with the list of inputs D1$ij$ to D6$ij$, each associated with a weighting coefficient K1$ij$ to K6$ij$. A history of the runways coefficients RWYCCi(t) each associated with their confidence index Cli(t) can also be provided in order to allow the derivation of a variation of runway coefficients to provide decision support based on the history of runway coefficient variation.

The invention claimed is:

1. An airport manager system for determining aircraft landing runway conditions, the airport manager system comprising at least one processor, wherein the at least one processor is adapted to:

acquire a set of data groups of different types for evaluating and monitoring deteriorating runway conditions of a runway, wherein a first data group of the set of data groups is acquired from a first source and a second data group of the set of data groups is acquired from a second source different from the first source;

determine weighting coefficients to each data group;

filtering the data of the set of data groups;

determine, for each data group, a partial runway condition for a sector of the runway based on the filtered data;

modify the weighting coefficients of each data group after filtering the data; and generate (i) a runway coefficient for the sector of the runway by combining the partial runway conditions and (ii) a confidence index associated with the runway coefficient, wherein the confidence index is derived from the modified weighting coefficients.

2. The method according to claim 1, wherein filtering the data comprises grouping the data by braking zone segments, each braking zone segment comprising with braking zone segment identification information, dating information of said data, segment position information, and a modified weighting coefficient.

3. The method according to claim 1, wherein the first data group (D1) relates to braking parameters of the aircraft and the second data (D2) is derived from the ground relating to taxiing conditions of the aircraft.

4. The method according to claim 3, wherein acquiring the first data group (D1) comprises acquiring the first data group from the first source as long as the aircraft is taxiing on the runway and at a speed below a threshold value.

5. The method according to claim 3, wherein, at an end of the filtering step, the method comprises determining a time-stamped coefficient of friction ($\mu$) of the runway and a modified weighting coefficient.

6. The method according to claim 5, wherein the filtering of the data for each data group produces first filtered data from the first data group and second filtered data from the second data group, and wherein, during the step of determining the coefficient of friction ($\mu$), the coefficient of friction is calculated from the first filtered data and the second filtered data.

7. The method according to claim 3, further comprising a step of decoding the data of the first and second data groups.

8. The method according to claim 3, wherein the second data group comprises aircraft position data, data on the conditions of the runway, and meteorological data.

9. The method according to claim 1, wherein modifying the weighting coefficients comprises modifying the weighting coefficients as a function of time or a sampling frequency of the data.

10. The method according to claim 1, comprising a step of initialising weighting coefficients for each data group before modifying the weighting coefficients.

11. The method according to claim 1, wherein the set of data groups further comprises a third data group.

12. The method according to claim 1, wherein the runway coefficient (RWYCC) is derived for different sectors of the runway, and wherein the method comprises compiling a history of runway coefficients is compiled.

13. The method of claim 1, further comprising communicating the runway coefficient and confidence index to an air traffic controller.

14. The method of claim 1, wherein the first source is the aircraft and the second source is a ground source.

15. An airport manager system for determining aircraft landing runway conditions, the airport manager system comprising at least one processor, wherein the at least one processor is adapted to:

acquire a set of data groups of different types for evaluating and monitoring deteriorating runway conditions of a runway;

determine weighting coefficients to each data group;

determine, for each data group, a partial runway condition, and modify the weighting coefficients of each data group; and generate (i) a runway coefficient by combining the partial runway conditions and (ii) a confidence index associated with the runway coefficient, wherein the confidence index is derived from the modified weighting coefficients.

16. The airport manager system according to claim 15, wherein the processor is configured to determine a runway coefficient (RWYCC) for each third of the runway, and wherein a history of runway coefficients is compiled.

* * * * *